Sept. 19, 1950        G. F. FREER        2,522,817
STUD OR VALVE SETTING TOOL
Filed Oct. 16, 1944        4 Sheets-Sheet 1
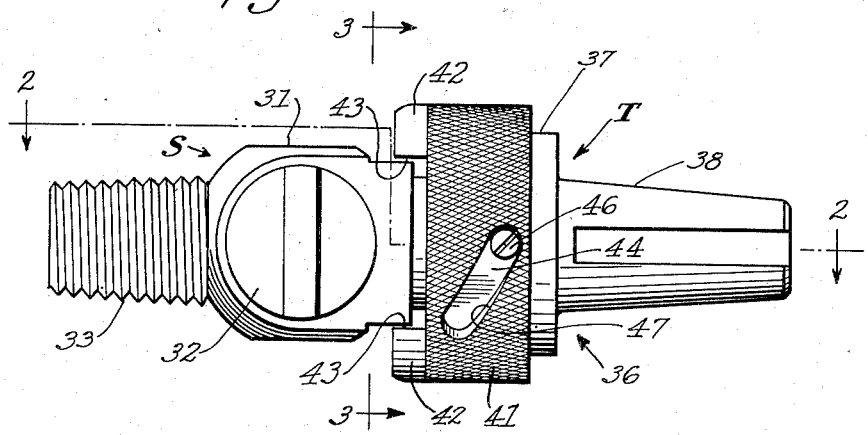
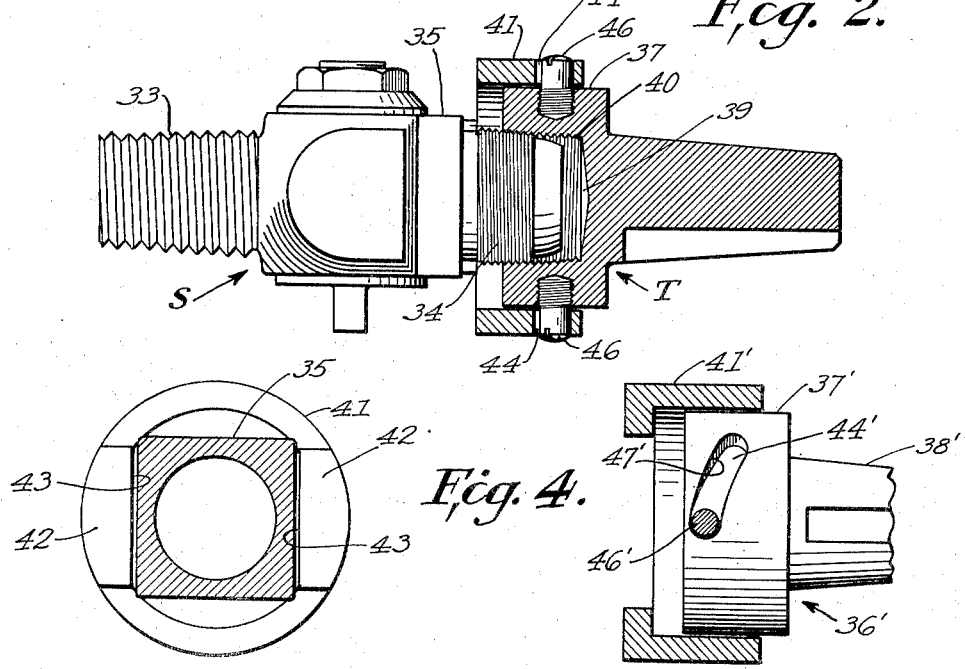
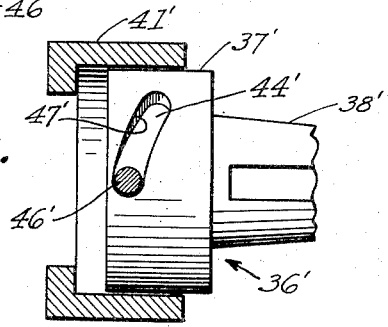
Inventor
Gorham F. Freer.
Attorneys

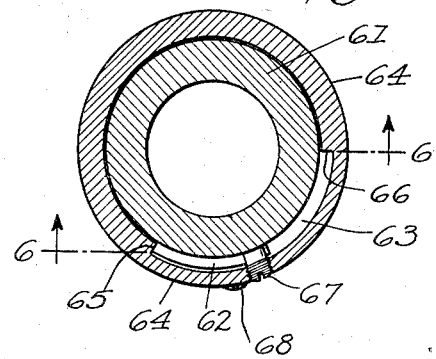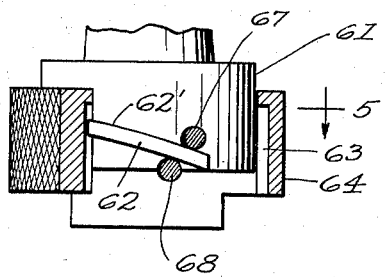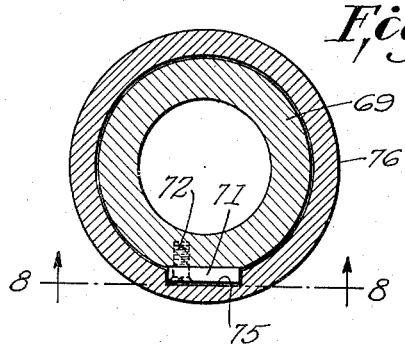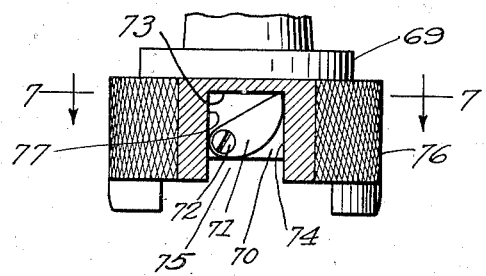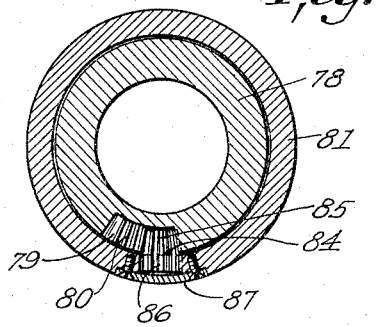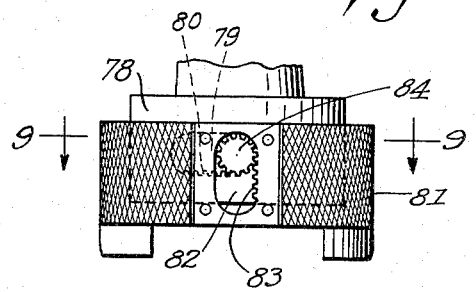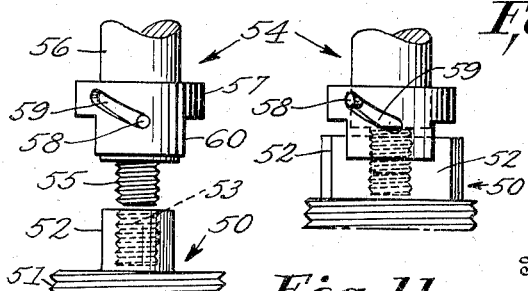

Sept. 19, 1950 G. F. FREER 2,522,817
STUD OR VALVE SETTING TOOL
Filed Oct. 16, 1944 4 Sheets-Sheet 3
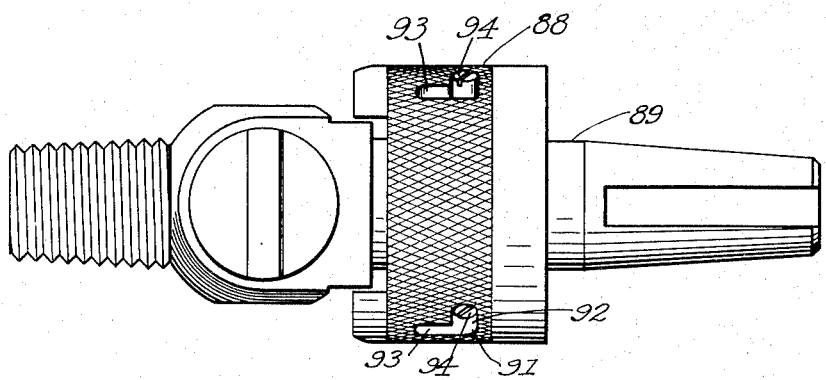
Fig. 13.
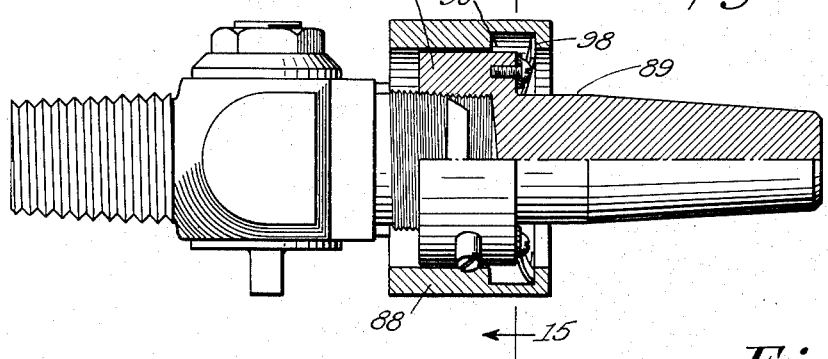
Fig. 14.
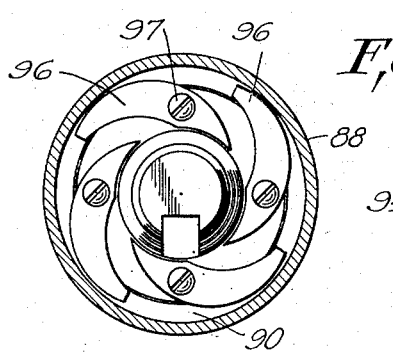
Fig. 15.
Fig. 16.
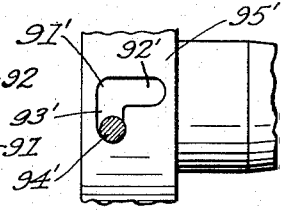
Fig. 17.
Inventor
Gorham F. Freer.
Attorneys Sept. 19, 1950 G. F. FREER 2,522,817
STUD OR VALVE SETTING TOOL
Filed Oct. 16, 1944 4 Sheets-Sheet 4

Inventor
Gorham F. Freer
By Cushman Darby Cushman
Attorneys

Patented Sept. 19, 1950

2,522,817

UNITED STATES PATENT OFFICE 2,522,817

STUD OR VALVE SETTING TOOL

Gorham F. Freer, Arlington, Va., assignor to Mueller Co., Decatur, Ill., a corporation of Illinois Application October 16, 1944, Serial No. 558,958

10 Claims. (Cl. 81—53)

This invention relates to a tool for inserting threaded members of which corporation stops are an example.

The usual corporation stop comprises a body formed with a seat for a rotary plug, the body having oppositely projecting threaded nipples of which one is intended for threading in an opening in a main and the other is intended to receive a service line coupling. When the main is under pressure which is to be held against substantial escape, a boring barrel is applied thereto, a hole is cut and threaded, and then the stop, through the intermediary of a special tool, is associated with the boring bar and then threaded in.

Heretofore, the tool customarily used has included a shank securable to the boring bar and a head having a threaded socket which is engaged with the coupling nipple of the stop. Torque is transmitted from the tool to the stop by the axial jamming of some part of the tool with same part of the stop and, consequently, it has frequently happened that after the stop has been threaded in, the jamming effect will cause it to follow the tool when the latter is attempted to be unthreaded from the stop. The stop, being at the bottom of the drilling equipment, is not accessible to be held by a hand tool against threading out.

Figure 18:
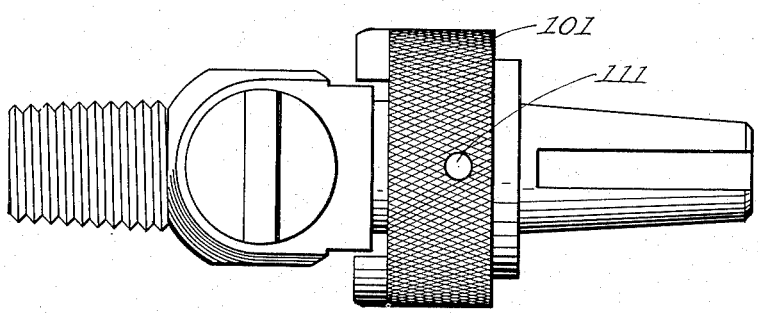
Figure 19:
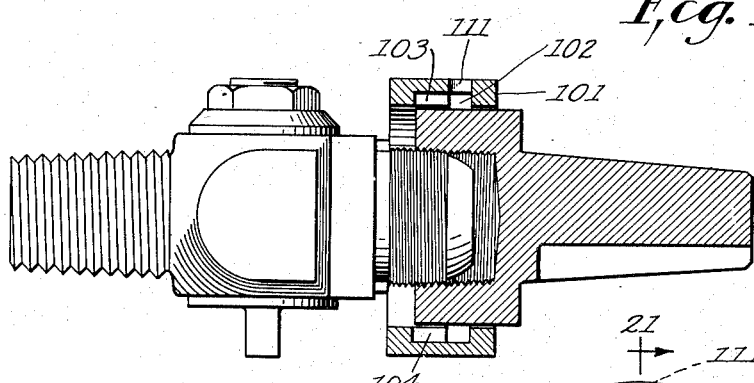
Figure 21:
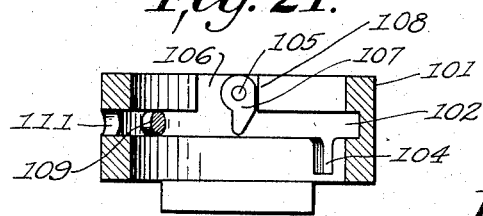
Figure 20:
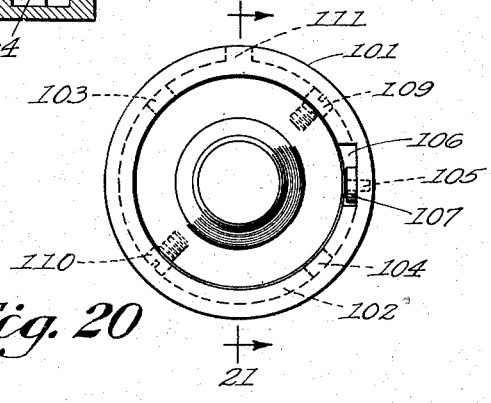
Figure 22:
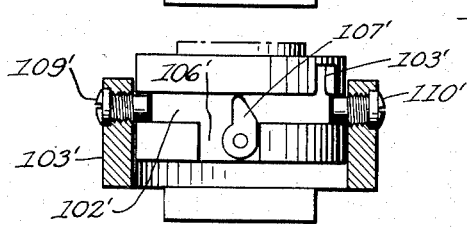

The main object of the present invention is to provide a tool which will transmit torque to the stop without any jamming action and can be detached from the inserted stop without any danger of threading the latter out. The new tool is shown in several embodiments in the accompanying drawings in which Figure 1 shows an elevation of one embodiment of the tool in association with a corporation stop, Figure 2 is a section on line 2—2 of Figure 1, Figure 3 is a section on line 3—3 of Figure 1, Figure 4 is a fragmentary axial section of a modified form of tool, Figure 5 is a section on line 5—5 of Figure 6, Figure 6 is a fragmentary elevation, partly in section on line 6—6 of Figure 5, of a further form of tool, Figure 7 is a section on line 7—7 of Figure 8, Figure 8 is a fragmentary elevation, partly in section on line 8—8 of Figure 7 of a further form of tool, Figure 9 is a section on line 9—9 of Figure 10, Figure 10 is a fragmentary elevation of a further form of tool, Figure 11 is a fragmentary elevation of a different form of tool and a different form of driven member with which the tool is about to be associated, Figure 12 shows the parts of Figure 11 in operative association, Figure 13 is an elevation of a further form of tool in association with a corporation stop, Figure 14 is a view like that of Figure 13 with the tool in axial section, Figure 15 is a section on line 15—15 of Figure 14, Figure 16 is a fragmentary elevation of the tool of Figure 13, Figure 17 is a fragmentary elevation, partly in section, showing a modification of the tool of Figure 13, Figure 18 is an elevation of a further form of tool in association with a corporation stop, Figure 19 is a view like that of Figure 18 but with the tool in axial section, Figure 20 is a plan view of the tool of Figure 18, Figure 21 is a section, with a part omitted, on line 21—21 of Figure 20, and Figure 22 is a fragmentary elevation partly in axial section showing a modification of the tool of Figure 18.

Referring first to Figures 1 to 3, reference letter S designates generally a corporation stop which, by way of example, is the same as that shown in the patent to Mueller et al., No. 2,331,714, of October 12, 1943. The stop comprises a body 31 having a through passage controllable by a plug 32, the passage extending through oppositely projecting right-hand threaded nipples 33 and 34 of which the former is intended for engagement in a threaded opening in a main and the latter is intended primarily for engagement by a service line coupling. Immediately adjacent the nipple 34, the body has a symmetrically disposed square formation 35.

The tool T comprises a body 36 which includes a cylindrical head portion 37 and a coaxial shank portion 38 which is engageable in the socket of a boring bar. Head 37 has a coaxial socket 39 provided with threads 40 which are engageable with the nipple 34.

Surrounding the body 36, and, specifically, the head 37, is a collar 41 which, as here shown, is provided with diametrically opposite jaws or abutment portions 42 having parallel faces 43 spaced apart a distance slightly greater than the length of a side of the square formation 35. Collar 41 is further provided with diametrically opposite, oppositely inclined, cam slots 44 in which are engaged diametrically disposed pins 46 which are threaded into head 37.

Assuming the tool is to be applied, the body 36 is turned relative to the collar 41 in a counter-clockwise direction as seen from the right of Figure 1 so that pins 46 will move to the opposite ends of slots 44 from that shown in Figure 1. The disposition of the cam slots is such that this relative rotation causes retraction of collar 41, i. e., movement toward the shank 38. Nipple 34 is now threaded for a distance into socket 39, whereupon the collar is held with the inner faces of jaws 42 parallel to faces of the square portion 35. With the collar held in this relation, the body 36 is threaded on enough further to bring the pins 46 into the slot ends as indicated in Figure 1, thereby projecting (i. e., moving away from the shank 32) the collar 41 so that the jaws 42 and 43 are caused to lie alongside faces of the square portion 35. In this procedure, care is taken not to thread the nipple 34 far enough into socket 39 so that there can be any possibility of axial jamming.

It will be seen that when the tool, applied to the stop as described, is turned in the threading-in direction of nipple 33, torque will be transmitted from the body 36 to the collar 41 through the abutment of pins 46 with the leading ends of their associated slots, the threaded engagement between the tool and the stop being relied upon solely for the purpose of holding the parts together during insertion.

When the stop has been fully threaded in, reverse rotation of the body 36 will cause the latter to unthread from the stop while, at the same time, pins 46, acting on those surfaces, 47, of the slots which are adjacent shank 38, will retract the collar, thus clearing the jaw portions from the stop and permitting the complete unthreading of the tool.

It will be observed that the pins 46 have two essential functions, namely, (1) the transmission of torque from the body to the collar due to abutment with the leading ends of slots 44 and (2) the retraction of the collar through coaction with the inclined or cam faces 47 of the slots.

It will be evident that a single pin and slot connection could be used but at least two such connections are preferred as giving a balanced action. It will also be evident that for the driving and retracting actions, the only essential parts of the slots are their leading end walls and their side walls 47.

In Figure 4, the illustrated arrangement is the equivalent of that just described, the difference being that the slot or groove 44′ is formed in the head 37′ while the pin 46′ is threaded through the side wall of the collar 41′ so as to project into the slot. When the body 36′ is turned in the inserting direction, the trailing end wall of the slot drives the pin 46′ and therewith the collar 41′. Upon reverse rotation of the body relative to the collar, the inclined wall 47′ of slot 44′, which is remote from the shank 38′, acts on pin 46′ to retract the collar. For convenience of reference, pins 46 and 46′ will herein both be considered to be cam followers, the term applying to the pin 46 at least in that it moves along the cam face although it displaces the cam rather than the cam displacing it.

In Figures 11 and 12, I have shown a tool adapted for the insertion of a plug such as is shown in the patent to Bowan et al., No. 2,310,351, of Feb. 9, 1943. In common with the stop shown in Figures 1 and 2, the plug 50 of Figures 11 and 12 has two coaxial sets of threads and an eccentric portion adapted to be engaged by the abutment portion or portions of the tool. The plug 50 comprises an externally threaded portion 51 surmounted by an integral, diametrical rib 52 having an internally threaded socket 53 coaxial with portion 51. The tool body 54 comprises the externally threaded head portion 55 and coaxial shank portion 56. A collar 57 surrounds the body, specifically the shank portion, and has the same pin and slot connection, 58 and 59, therewith as is shown in Figures 1 and 2. The collar has opposite jaw or abutment portions as at 60 which are spaced apart so as to be disposable alongside of the rib 52 in the manner indicated in Figure 12. The tool is applied in the same manner as previously described, care being used to avoid any axial jamming. It will be evident that when the tool body is rotated to move the pin 58 to the right, Figure 12, the collar will be retracted to move the jaws above the top of the rib by the time pin 58 reaches the right-hand end of slot 59, thus permitting the complete unthreading of the tool without any unthreading effect, except for negligible thread friction, on the plug.

Figures 5 and 6 show another form of stop inserting tool. The cylindrical head 61 of the tool body is provided with a projecting arcuate cam rib 62 which is received in an annular recess 63 in the collar 64, the recess having end walls 65 and 66 which are spaced apart a distance greater than the length of rib 62. Reference numerals 67 and 68 designate screws threaded in radial holes in the collar to position their inner ends respectively above and below the rib, as particularly shown in Figure 6. In that figure, the left-hand end of the rib is against the end wall 65 of the recess 63 so that when the tool body is turned, the collar 64, which is in projected relation, will be positively driven in the threading-in direction. When the stop has been inserted, reverse rotation of the tool body will cause the cam face 62′ of rib 62 to lift collar 64 through pin 67 and thereby release the collar jaw or abutment portions from the stop, just as in the first embodiment. Obviously the rib could be on the collar, and the recess and screws in the head.

In the stop inserting tool of Figures 7 and 8, the cylindrical head portion 69 of the tool body has a flattened portion 70 over which is swingable a toggle finger 71 which is pivoted to the head portion by means of a screw 72 near the lower edge of the surface 70. Finger 71 extends upwardly at an angle and trailingly as regards the threading-in direction, and has a nose portion received in the angle between the intersecting walls 73 and 74 of a recess 75 formed in the collar 76. The opposite rounded end of the finger is in abutment with a recess wall 77 parallel to wall 74. In view of this arrangement, the collar cannot drop relative to the head below the position shown but it may be pulled upwardly, in order to enable the stop to be threaded into the head socket, and then projected to the position shown in Figure 8, so that the collar jaws are in position to turn the stop. Torque is transmitted from the head to the collar through the abutting portions of finger 71 and wall 77. When the stop has been inserted, reverse rotation of the tool body will move finger 71 and screw 72 to the right relative to the collar, thereby moving the finger toward an upright position and lifting the collar jaws clear of the plug so that the tool can be completely unthreaded without disturbing the stop. Obviously the finger could be on the collar, and the recess in the head.

In Figures 9 and 10 the head portion 78 is provided externally with a circumferentially extending slot or groove 79 whose bottom wall is provided with bevel gear teeth 80. The collar 81 is provided with an axially extending slot 82 whose right-hand wall, Figure 10, is provided with gear teeth 83. Reference numeral 84 designates generally a floating roller constituted at one end, 85, as a bevel gear engaging the teeth 80 and at the other end as a spur gear 86 engaging the teeth 83. The teeth 85 are held in engagement with the teeth 80 by the top wall of slot 89 while the teeth 86 are held in engagement with teeth 83 by the left-hand wall, Figure 10, of slot 82. In Figure 10 the collar is projected, and when the tool body is turned in the threading-in direction, torque will be transmitted from the right-hand end wall of slot 79 through the roller 84 to the left-hand wall of slot 82 and the collar will be positively driven. Upon reverse rotation of the head, teeth 80 will rotate the roller in counter-clockwise direction, Figure 10, so that teeth 86 will move the rack 83 upwardly to release the collar jaws. In Figure 9 a plate 87 is shown as closing the outer side of slot 82 so as to hold the roller 84 in place. In Figure 10 plate 87 is omitted for the sake of clarity.

In Figures 13 to 16 there is shown a stop inserting tool which relies on spring action for retraction of the collar. In this case, the collar 88 is somewhat wider than in the previously described stop inserting tools and is provided, near its edge which is adjacent the shank 89, with an annular, internal groove 90. The collar is provided, as here indicated, with three equi-distantly spaced angular slots 91 each of which has a circumferentially extending portion 92 and an axially extending portion 93, and engaged in each slot is a screw 94 which is radially threaded into the head 95. A number of leaf springs 96 are secured to the top of the head by screws 97 and have their free ends in channel 90 engaging the wall 98 thereof so as to act to retract the collar relative to the tool body as limited by the screws 94, as shown in Figure 16. With the collar in this relation, the stop is threaded in the head socket a short distance whereupon the collar is pulled against the action of springs 96 to position its jaw portion or portions alongside the square portion of the stop body. Hereupon, the tool body is turned to bring the screws 94 into the horizontal portions 92 of the slots and into abutment with the end walls thereof through which torque is transmitted to the collar in the threading-in direction, the screws holding the collar projected by reason of their presence in the slot portions 92. When the stop has been fully inserted, reverse rotation of the tool body brings screws 94 into register with the axially extending slot portions 93 and thereupon springs 96 act to retract the collar and free the jaws from the stop.

In assembly, the collar is slipped over the head and then the springs are successively placed in position and the screws 97 applied. The inner ends of the springs are shaped for abutment with the shank 89 so as to prevent their pivoting. Since the outer ends of the springs have only a frictional engagement with the collar, substantially free relative rotation of the tool body and collar is permitted within the limits determined by screws 94.

Figure 17 shows a reversal of the arrangement just described in that the angular slot or groove 91' is formed in the head 95' and the screw 94' is threaded in an axial hole in the collar to bring its inner end into the slot 99. The pin 94' is shown in the position which it occupies during the threading-in operation.

Returning to Figures 18 to 21, which illustrate another form of stop inserting tool, the collar 101 is provided with an annular, internal groove 102 from which axially directed grooves 103 and 104 extend toward the jaw end of the collar. Pivoted on a pin 105 in a recess 106 of the collar is a dog 107 having a depending end in the channel 102. Referring to Figure 21, the dog can swing freely in a clockwise direction but is held against swinging in counter-clockwise direction due to abutment with the right-hand wall 108 of the recess 106. Reference numerals 109 and 110 designate screws threaded in diametrically opposite holes in the collar with their heads in the channel 102, the screws being successively introduced through a hole 111 provided in the collar at the channel 102 for that purpose.

When the tool is to be applied to the stop, the screws 109 and 110 are brought over the axially extending grooves 103 and 104 so that the collar can be retracted. When the tool and stop threads have been sufficiently engaged, collar is projected so that the screw heads are brought into channel 102. When the tool body is now turned, one of the screw heads, moving to the right, Figure 21, will strike dog 107 so that torque will be transmitted to the collar and the stop will be driven. Thereafter, the tool body can be completely threaded off, turning relative to the collar as permitted by the swinging of the dog 107.

Figure 22 shows a reversal of the structure just described in that the channel 102' is formed in the head portion instead of in the collar and the dog 107' is pivoted in a head recess 106'. Diametrically opposite grooves, as at 103', extend axially from the channel 102' in the direction of the shank. Screws 109' and 110' are threaded in diametrically opposite openings of the collar 103' to bring their inner ends into the channel 102'. The operation is the same as described in connection with Figures 18 to 21.

The collar of each of the described tools is shown as having a pair of jaw or abutment portions. A single such portion could be used but two give a better balanced action. Actually the jaw portions could be parts of a complete socket shaped to receive the portion, as at 35, of the member to be turned, and this latter portion may be of any non-circular form. It is only necessary that the member to be inserted have an eccentric abutment portion engageable and releasable by an abutment portion of the tool in the manner which has been described. The invention is not necessarily limited to the disclosed forms and arrangements of parts, variations being possible and contemplated under the following claims.

I claim:

1. A tool for turning a member having two coaxial sets of threads of which one is to be engaged with the mating threads of a stationary element by the turning of said member, said member including an abutment portion eccentric with respect to the axis of said sets of threads; said tool comprising a body including a head portion threaded for engagement with the other of said sets of threads upon rotation of said head portion relative to said member in the same direction in which said member is to be turned for engaging said one set of threads with said mating threads, whereby to hold the member to the tool; said body comprising a shank portion fixed to said head portion coaxially therewith, a collar axially slidable and rotatable on said body and having an abutment portion on its side toward the free end of said head portion; said collar being maintainable retracted from said member while said head portion is being engaged therewith and then being movable toward said member to bring the abutment portion of said collar, prior to any jamming between said body and member, into position to engage the abutment portion of said member upon the turning of said collar relative to said member; cooperating abutment means on said collar and said body engageable to transmit torque from said body to said collar in the thread-engaging direction but permitting reverse rotation of said body relative to said collar, and means arranged between said body and collar acting upon such reverse rotation to retract the collar so as to free said abutment portions.

2. A tool for turning a member having two coaxial sets of threads of which one is to be engaged with the mating threads of a stationary element by the turning of said member, said member including an abutment portion eccentric with respect to the axis of said sets of threads; said tool comprising a body including a head portion threaded for engagement with the other of said sets of threads upon rotation of said head portion relative to said member in the same direction in which said member is to be turned for engaging said one set of threads with said mating threads, whereby to hold the member to the tool; said body comprising a shank portion fixed to said head portion coaxially therewith, a collar axially slidable and rotatable on said body and having an abutment portion on its side toward the free end of said head portion; said collar being maintainable retracted from said member while said head portion is being engaged therewith and then being movable toward said member to bring the abutment portion of said collar, prior to any jamming between said body and member, into position to engage the abutment portion of said member upon the turning of said collar relative to said member; cooperating abutment means on said collar and said body engageable to transmit torque from said body to said collar in the thread-engaging direction but permitting reverse rotation of said body relative to said collar, and cam means arranged between said body and collar acting upon such reverse rotation to retract the collar so as to free said abutment portions.

3. A tool of the class described comprising a body member including a threaded head portion and a coaxial shank portion, a collar member surrounding said body member and axially and rotatably movable relative thereto, said collar member having an eccentric abutment portion projecting oppositely from said shank portion, cooperating abutment means on said body and collar members for transmitting torque from said body member to said collar member in the threading-in direction of said head portion but permitting rotation of said body member relative to said collar member in the unthreading direction, and means between said body and collar members operative to displace said collar member toward said shank portion upon said relative rotation in the unthreading direction, the last-named means comprising means providing a cam surface on one of said members and follower means for said cam surface on the other of said members.

4. A tool of the class described comprising a body member including a threaded head portion and a coaxial shank portion, a collar member surrounding said body member and axially and rotatably movable relative thereto, said collar member having an eccentric abutment portion projecting oppositely from said shank portion, and a pin and slot connection between said body and collar members of which the slot is so inclined that upon rotation of said body member relative to said collar member in the unthreading direction, said collar member will be displaced toward said shank portion.

5. A tool of the class described comprising a body member including a threaded head portion and a coaxial shank portion, a collar member surrounding said body member and axially and rotatablly movable relative thereto, said collar member having an eccentric abutment portion projecting oppositely from said shank portion, a generally circumferentially extending rib on one of said members and a circumferentially extending recess in the other of said members receiving said rib, said recess having axially extending end walls spaced apart a distance greater than said rib and adapted to be respectively abutted by the ends of said rib to transmit torque from said body member to said collar member, said rib having an inclined face on its side adjacent said shank portion, and follower means for said inclined face on the other of said members, the inclination of said face being such that upon rotation of said body member relative to said collar member in the unthreading direction of said head portion, said collar portion will be moved toward said shank portion.

6. A tool of the class described comprising a body member including a threaded head portion and a coaxial shank portion, a collar member surrounding said body member and axially and rotatably movable relative thereto, said collar member having an eccentric abutment portion projecting oppositely from said shank portion, one of said members having a circumferential slot and the other having a pin engaged in said slot, an axially extending slot joining said circumferential slot and adapted to receive said pin to permit said collar member to be moved relative to said body member toward said shank portion, and a dog projecting into said circumferential slot and engageable by said pin to transmit torque from said body member to said collar member in the threading-in direction of said head portion, said dog yielding to pass said pin when said body member is reversely rotated relative to said collar member, whereby the threading-off of said tool is permitted.

7. A tool for inserting a member having threaded front and rear ends and a lateral abutment therebetween, said tool comprising a head having a threaded forward end complemental to the rear end of the member, a collar surrounding the head and mounted thereon for relative rotational and axial sliding movement and having a forwardly projecting lateral abutment arranged for driving cooperation with the abutment on the member when the collar is in its axially forwardly projected position, and means interconnecting the head and collar, limiting the relative movement therebetween, holding the collar in the forwardly projected position upon the application of torque to the head in a direction to screw-in the member, and imparting an axial retracting force to the collar upon the application of torque to the head in a direction to unscrew the member.

8. A tool in accordance with claim 7 characterized in that the means interconnecting the head and collar includes a cam and cam follower.

9. A tool in accordance with claim 7 characterized in that the means interconnecting the head and collar includes an inclined slot and a pin disposed in the slot.

10. A tool in accordance with claim 7 characterized in that the means interconnecting the head and collar includes a spring for retracting the collar and a catch resisting the force of the spring until the head is rotated relative to the collar to a predetermined point in an unscrewing direction.

GORHAM F. FREER.

REFERENCES CITED

The following references are of record in the file of this patent:

UNITED STATES PATENTS

| Number | Name | Date |
| --- | --- | --- |
| 1,125,186 | Schneider | Jan. 19, 1915 |
| 1,155,662 | Kleinsteuber | Oct. 5, 1915 |
| 1,308,490 | Funk | July 1, 1919 |
| 1,384,415 | Weichhart | July 12, 1921 |
| 2,247,427 | Mueller et al. | July 1, 1941 |